Aug. 24, 1943.  S. F. ARMINGTON  2,327,385
COMBINED DIRT SPREADER AND BUMPER
Filed Dec. 18, 1941  3 Sheets-Sheet 1
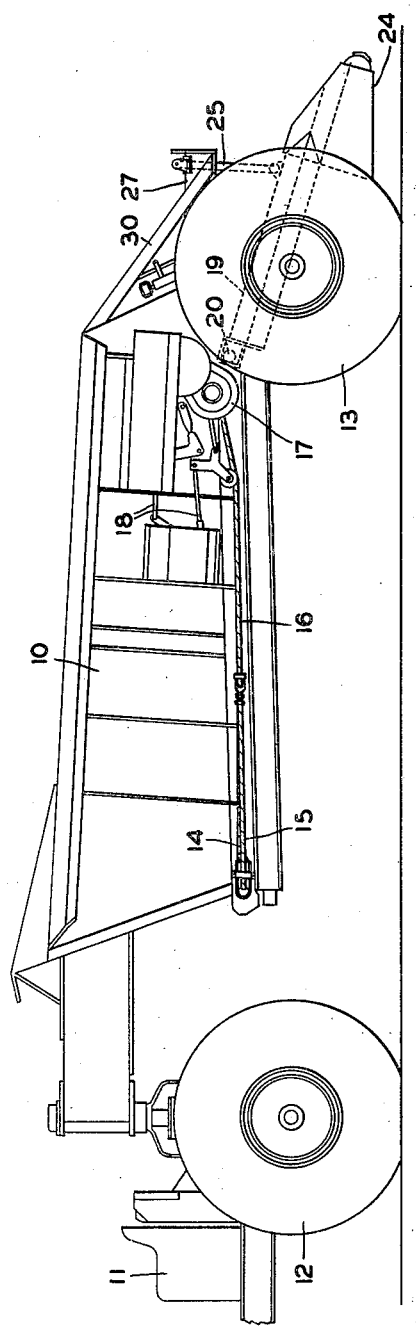
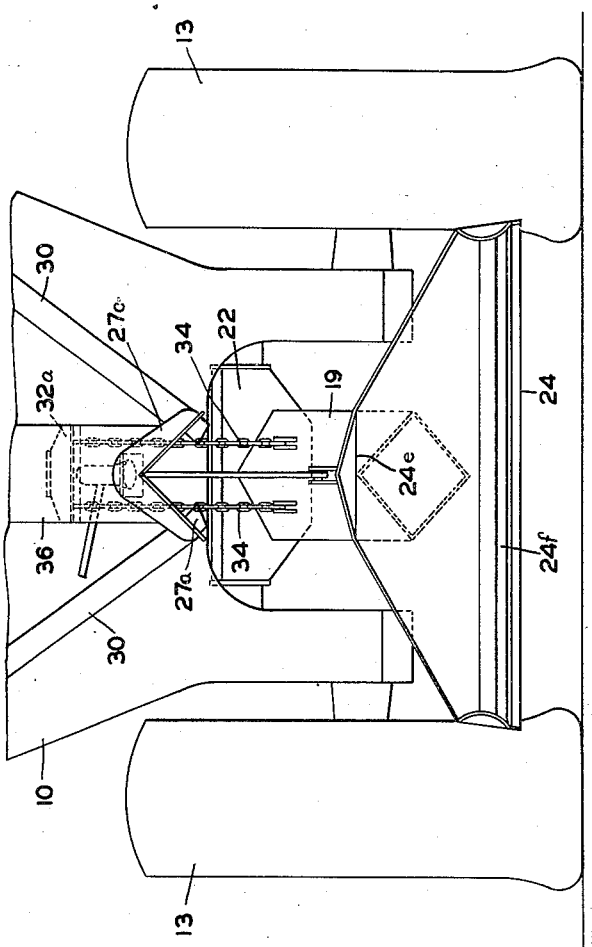
INVENTOR
STEWART F. ARMINGTON
BY
*Hyde and Meyer*
ATTORNEYS

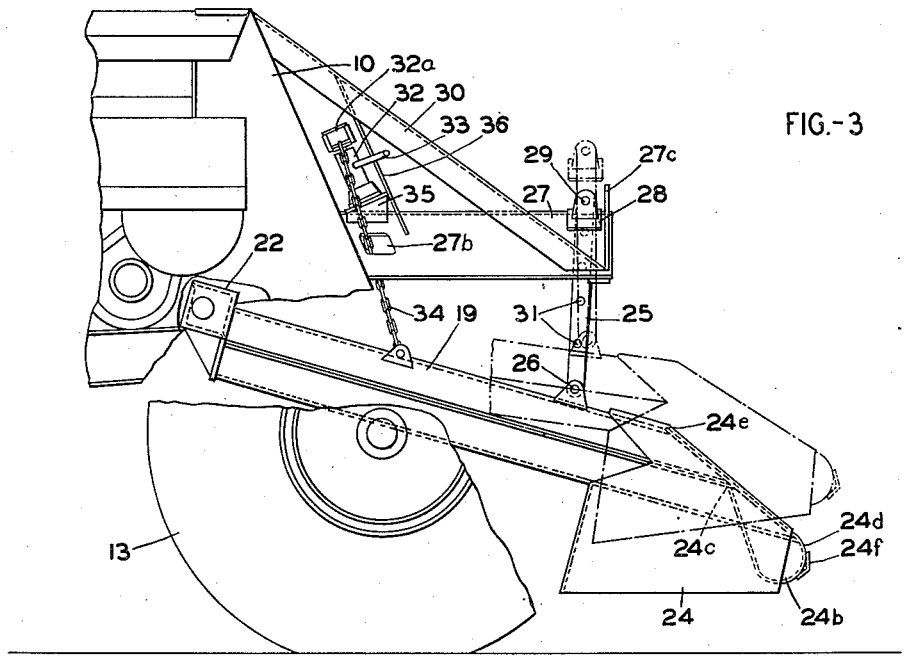
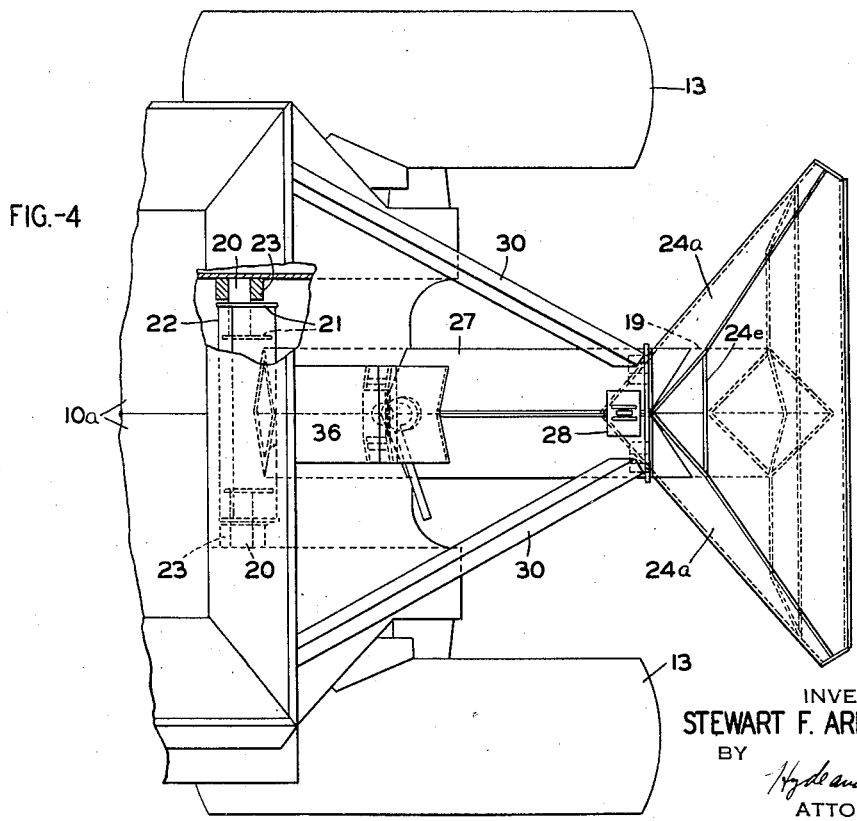

Aug. 24, 1943.                S. F. ARMINGTON                  2,327,385
                       COMBINED DIRT SPREADER AND BUMPER
                          Filed Dec. 18, 1941        3 Sheets-Sheet 3

INVENTOR
STEWART F. ARMINGTON
BY
*Hyde and Meyer*
ATTORNEYS

Patented Aug. 24, 1943

2,327,385

UNITED STATES PATENT OFFICE 2,327,385

COMBINED DIRT SPREADER AND BUMPER

Stewart F. Armington, Willoughby, Ohio, assignor to The Euclid Road Machinery Company, Euclid, Ohio, a corporation of Ohio Application December 18, 1941, Serial No. 423,440

4 Claims. (Cl. 94—44)

This invention relates to a combined dirt spreader and bumper for use at the rear end of a vehicle.

One of the objects of the present invention is to provide a device at the rear-end of a dumping vehicle mounted for movement between upper and lower positions whereby in various adjusted lower positions it may be used as a dirt spreader, in its upper position it substantially clears a dumped load, and in any position it may be used as a bumper.

Among other features of the device are the provision of a pivotal mounting so placed as to maintain the spreader in a nearly horizontal position in any of its dirt spreading positions. The pivot means is so arranged as to give great lateral stability to the combined spreader and bumper. Means is provided for holding the spreader in various adjusted positions relative to the ground when used as a spreader and also permitting free movement upwardly if desirable for clearing obstructions. Means is also provided for lifting the device to uppermost bumper position and for holding it there and, more particularly, for bracing the device against movement in any direction when the device is being used as a bumper only.

Certain of the features of the device are useful if it is used as a dirt spreader only, as will more readily appear from the accompanying drawings and description. The essential features of my improved device will be set forth in the appended claims.

Figure 5:
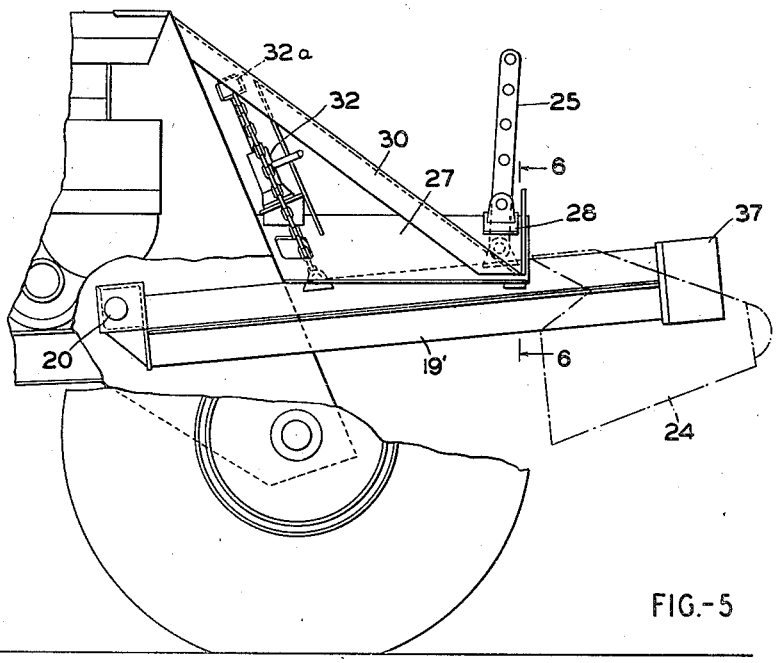
Figure 6:
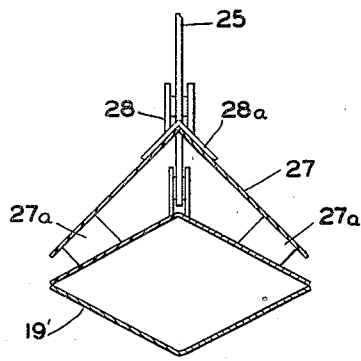

Fig. 1 is a side elevation of a bottom dump trailer wagon equipped with my device; Fig. 2 is an enlarged fragmental rear elevational view of the device of Fig. 1; Fig. 3 is an enlarged fragmental side elevational view of the device of Fig. 1; Fig. 4 is an enlarged fragmental top plan view of the device of Fig. 1; Fig. 5 is a view similar to Fig. 3 showing how a simple bumper may be used alternatively with the combined bumper and spreader device; while Fig. 6 is a sectional view taken along the line 6—6 of Fig. 5.

My invention is useful in various of its aspects with different types of vehicles. For the purpose of illustration it has been shown attached to a bottom dump trailer wagon 10 of a type fully described and claimed in Patent No. 2,233,193 granted February 25, 1941, to George E. and Stewart F. Armington. The wagon here shown is supported at its forward end on a tractor 11 having wheels 12 and is supported at its rear end by the wheels 13. This wagon body 10 has greater cross-sectional area toward the front than at the rear as described in the above mentioned patent and this leads to certain special operating advantages in connection with my improved dirt spreader device as will later appear.

The wagon body 10 is here shown equipped with a power winding device for controlling the bottom dumping doors 10a. This is of the type fully disclosed and claimed in Patent No. 2,055,919 granted September 29, 1936, to Arthur P. and George E. Armington. Suffice it to say here that cables 14 and 15 are connected with the right and left-hand bottom doors of the wagon. The cable 16 leads back to a winding drum 17, the operation of the doors being controlled by devices connected to the bars or cables 18.

At the rear end of the vehicle a beam 19 is pivotally mounted by pivot pins 20 for oscillation in a vertical plane. It will be noted that these pivot pins are held by cross plates 21 of a hollow beam 22 of substantially square section built up out of welded plates. The pivot pins rest in bearings 23 which are arranged by any usual means, not shown, for removal of the pivot pins 20 from their bearings for repairs or replacement of the spreader and bumper device.

To the rear end of beam 19 is rigidly secured a combined spreader and bumper device 24. This device comprises a pair of plates 24a forming a V-plow diverging rearwardly and the plates sloping upwardly and rearwardly at a slight angle as indicated so that when the plow has buried itself in the dirt to be spread the pressure on the plow urges it downwardly. The rear ends of the plates 24a are connected by a structural beam 24b sufficiently strong to withstand the bumper action later described. As here shown this structural beam comprises a plate extending from a point 24c downwardly and rearwardly, then curved at the point 24d and then upwardly and forwardly connecting with the tops of plates 24a and terminating on the line 24e. Thus the portion of the plate between 24d and 24e provides a cover over the space between the plates 24a. It will be noted that beam 19 extends entirely through the dirt spreader device to the rear end and is welded to the plates of the spreader device so that the entire construction is very solid from the structural member 24b forward to the vehicle body to transmit the necessary forces when the device is used as a bumper. A bumper member or wearing plate 24f may be attached along the rear edge of member 24b as shown, if desired. The rounded form of the member 24b at the point 24d enables proper engagement of the same by a pusher means regardless of the height of the dirt spreader and bumper device off the ground.

It will be noted that the beam 19 is of such a form that its lower edge forms a dirt parting or spreading surface in case the dirt piles up beneath the device as high as the beam 19 and the top of the beam 19 also is shaped to prevent dirt collecting thereon. In the form here shown the beam is of hollow diamond shape built up from welded plates.

Means is provided for holding the V-plow in various predetermined positions relative to the ground so as to spread the dirt to the desired depth. Preferably but not necessarily this device is arranged to permit free movement of the dirt spreader upwardly in case obstructions are encountered or in case the dirt is of such a heavy or sticky character that the plow cannot spread it. The device shown for this purpose comprises a bar 25 pivotally connected to beam 19 at the point 26. This bar extends upwardly through a suitable opening in a support 27 which is rigidly attached to the vehicle 10. A stop member 28 is bolted at 29 to the bar 25 and rests upon the support 27 to control the lower limit of movement of the spreader plow while at the same time permitting free upward movement thereof.

The support 27 as here shown is of inverted V-form in transverse section as best viewed in Fig. 6. The inner end of this support is welded or otherwise secured to the wagon body and the outer end thereof is braced by structural members 30 which extend diagonally to laterally spaced points on the wagon body. The shape of the support 27 strengthens it while at the same time preventing the collection of dirt on top of it. The rear end of the member 27 is strengthened by an upstanding fin 27c. The stop member 28 carries at its lower end an inverted V-saddle 28a complementary to the top surface of the support 27.

It is desirable that the spreader device be firmly held in its uppermost position when used chiefly as a bumper. To this end means is provided on the support 27 to firmly hold the spreader device in its uppermost position as viewed in Figs. 5 and 6. For this purpose blocks 27a secured to the under side of the support 27 have surfaces firmly engaging the upper surface of beam 19 in its uppermost position. An inspection of Fig. 6 will show that motion sidewards of the beam 19 is impossible. Therefore when the device is used in its uppermost position as a bumper, if a pushing force is applied at the rear having a component tending to move the beam 19 sidewards, such movement is resisted by the blocks 27a, the support 27 and the members 30.

It will be noted that the bar 25 has a number of holes 31 to which the stop member 28 may be bolted. This will control the position of the device 24 relative to the ground when spreading dirt or when the bar 25 is raised to its highest position it will hold the device in its uppermost position as indicated in the dot-dash lines of Fig. 5, which is the position of the device 24 when used chiefly as a bumper. Means is provided for raising and lowering the beam 19 and the device 24 as it will be understood that this device is fairly heavy. This means comprises a hand-operated jack 32 which is raised and lowered in the usual manner by manipulation of the handle 33. The jack has a crosshead 32a to which are attached the chains 34 which extend downwardly from the jack head 32a to the beam 19. Suitable openings 27b are provided in the support 27 to permit the passage of the chains. A suitable structural support 35 is provided for the base of the jack. A plate 36 forms a protection over the jack against dirt or other falling objects. The point of connection of chains 34 to beam 19 is sufficiently near the pivots 20 as to require but a relatively short stroke of jack 32 to produce the raising and lowering movement of beam 19. The weight of the beam 19 and device 24 is not carried by jack 32 except when adjustment is being made to a new stop position on the slide bar 25. The stop 28 and bar 25 normally carry all of this weight. This will be recognized as an advantage because the bouncing of the device is great when the machine travels at high speeds over very rough ground.

If dirt spreading action is not desired a plain bumper may be substituted for the device thus far described as shown in full lines in Fig. 5. This comprises a beam 19' in all respects similar to that already described mounted on pivot pins 20 in the bearings 23 and supported by a bar 25 and a support 27 in the fashion already described. This beam, however, will be provided at its rear end with a bumper block 37 instead of the plow device.

Referring to Fig. 4, it will be noted that the plow device is located rearwardly of the wheels 13 so that the wheels do not climb up upon the dirt after it is spread, thus aiding in keeping the dump at the level desired. It will also be noted that the plow is wide enough to extend directly back of the treads of the tires on the rear wheels and the dirt will roll away from the plates 24a substantially to the full tread of the vehicle wheels. However the rear ends of the plates 24a are so positioned that the earth being spread will substantially clear the wheels 13.

The entire device is close enough to the vehicle body so that in ordinary rough ground the device 24 will not strike the ground when the wheels 13 drop into any ordinary depression. The pivotal axis 20 for the beam 19 is sufficiently high so that this beam normally clears the usual windrow of dirt behind the vehicle.

The pivotal mounting 20 is placed sufficiently ahead of the dirt spreader to keep the angular position of the spreader at a minimum and it is moved up and down to various spreading positions. This keeps the blanket of material being spread at a reasonably uniform thickness under the extreme ends of the wings 24a as compared to the thickness under the plow point.

Oftentimes bottom dump machines of the character here described are pushed with a tractor which is equipped with a bulldozer. It is possible for this bulldozer to engage my improved bumper in a lower position and to raise the bumper to its uppermost position by hoisting the bulldozer. In this uppermost position the bumper engages beneath the saddle support 27. It is then possible for the tractor and bulldozer to shift the entire trailer wagon sidewise if desired. The saddle 27 and its braces are strong enough to permit this action. This is often necessary to get out of a tight corner.

The total weight of my combined spreader and bumper assembly is little if any greater than the weight of the plain bumper assembly shown in Fig. 5 so that I am able to get the advantages of the dirt spreading device without substantial increase of the weight at the rear of the vehicle. This is valuable in a device of this sort where the tractive effort is applied at the wheels 12 near the front end of the vehicle and the weight should be concentrated at that point rather than toward the rear of the vehicle.

When my improved device is used in connection with the wagon body shown at 10, the dirt at the rear of the wagon body drops first, leaving the dirt momentarily in the front of the wagon body which is of deeper section. This keeps the weight on the drive wheels 12 for a period of time slightly longer than would otherwise be the case. This makes the spreader more practical since part of the spreading action by the device 24 is started before the dirt breaks loose at the front end of the wagon body. This is particularly true in the case of wet materials which are harder to spread. In the case of free-flowing material, the bottom dump doors of the body 10 may be held in partly open position by the control means mentioned so as to make a long, narrow windrow of dirt which is easy to spread.

What I claim is:

1. In combination, a bottom-dump vehicle, a combined dirt spreader and bumper device, a beam pivotally mounted on the rear end of said vehicle, said device being carried by said beam for movement between a lower position and an upper position, a fixed support on said vehicle above said beam and engaging said device in its upper position to hold it rigid for use chiefly as a bumper, a bar connected with said beam and slidable past said support as said beam oscillates about its pivot, and stop means on said bar above said support adapted to engage said support and limit downward movement of said device for use as a spreader while permitting free movement of said device upwardly to clear obstructions.

2. In combination, a bottom-dump vehicle, a combined dirt spreader and bumper device, means mounting said device at the rear end of said vehicle for movement between a lower position where it acts as a spreader and an upper position, said device and mounting means forming an assembly substantially rigid in a fore-and-aft direction, and fixed support means on said vehicle above said assembly and engaging the latter when said device is in its upper position to hold said assembly against upward and sideward movement, said support means then holding said assembly sufficiently rigid for use of said device as a bumper for pushing said vehicle forward.

3. In combination, a bottom-dump vehicle, a combined dirt spreader and bumper device, a beam pivotally mounted on the rear end of said vehicle, said device being mounted rigid with said beam for movement upward and downward as said beam pivots, and means definitely fixing said beam against downward movement relative to said vehicle when said device is in lowered position, whereby a push on the rear end of said device in lowered position is directly transferred to said vehicle through the rigid connection of said device with said beam and the pivotal connection of said beam with said vehicle.

4. In combination, a bottom-dump vehicle, a combined dirt spreader and bumper device, means mounting said device at the rear end of said vehicle for movement between a lower position where it acts as a spreader and an upper position, said device and mounting means forming an assembly substantially rigid in a fore-and-aft direction, and means definitely fixing said assembly against downward movement relative to said vehicle when said device is in lowered position, whereby a push on the rear end of said device in lowered position is directly transferred to said vehicle.

STEWART F. ARMINGTON.